United States Patent
Huang et al.

[11] Patent Number: 5,835,507
[45] Date of Patent: Nov. 10, 1998

[54] ERROR SENSING METHOD FOR IMPROVING ERROR CONTROL CAPABILITY IN DATA COMMUNICATIONS

[75] Inventors: Shih-Wei Huang, Taipei; Jeng-Jye Wu, Pan Chiao, both of Taiwan

[73] Assignee: Chaw Khong Co., Ltd., Taipei, Taiwan

[21] Appl. No.: 505,834

[22] Filed: Jul. 21, 1995

[51] Int. Cl.$^6$ .............................. G08C 25/02; H04L 1/18
[52] U.S. Cl. ............................ 371/32; 371/5.1; 371/37.1
[58] Field of Search ............................. 371/32, 33, 37.1, 371/43, 5.1, 5.5, 46, 42

[56] References Cited

U.S. PATENT DOCUMENTS

| | | | |
|---|---|---|---|
| 4,321,704 | 3/1982 | Lemoine | 371/49.1 |
| 4,907,233 | 3/1990 | Deutsch et al. | 371/37.4 |
| 5,166,890 | 11/1992 | Smischny | 371/5.1 |
| 5,210,751 | 5/1993 | Onoe et al. | 371/32 |
| 5,400,348 | 3/1995 | Yang | 371/42 |
| 5,430,738 | 7/1995 | Tsuda | 371/32 |
| 5,475,716 | 12/1995 | Huang | 371/37.1 |
| 5,483,545 | 1/1996 | Darmon et al. | 371/32 |

OTHER PUBLICATIONS

"Error Control Coding"—Fundamentals and Applications by Shu Lin, Daniel Costello, pp. 68–76, 79–82, Date Unknown.

*Primary Examiner*—Paul P. Gordon
*Assistant Examiner*—Robert J. Dolan
*Attorney, Agent, or Firm*—The Kline Law Firm

[57] ABSTRACT

An error sensing method for increasing error control accuracy and efficiency of a data block having a plurality of ECC (error control code) coded words transmitted through a communication media, the method comprising the steps of:

(1) inserting a plurality of sensing bits into one or more predetermined positions within the data block;
(2) modulating and transmitting the data block to the communication media;
(3) receiving and demodulating the data block from the communication media;
(4) extracting the sensing bits out of the received data block and calculating a BER by using the extracted sensing bits; and
(5) requesting for retransmission if the BER of the received data block is worse than a predetermined BER1 which is approximately equal to the ratio of the number of maximum detectable errors of the ECC to the number of bits contained in one ECC coded word.

The data block is modulated by using amplitude-shift-keying (ASK) modulation and each of the sensing bits is modulated as a negative edge which is most sensitive to noises contained within the communication media.

12 Claims, 4 Drawing Sheets

ERROR SENSING METHOD FOR IMPROVING ERROR CONTROL CAPABILITY IN DATA COMMUNICATIONS

BACKGROUND OF THE INVENTION

1. Field of the Invention

This invention relates to error control in data communications, and more particularly, to an error sensing method for estimating a bit error rate (BER) of a data block which comprises a plurality of ECC (error control code) coded words transmitted through a communication media to improve error control accuracy and efficiency.

2. Description of the Prior Art

Error control code (ECC) techniques such as parity check or Hamming code are commonly used in data communications for detecting or correcting errors. Such techniques usually convert a data word into an ECC coded word by adding some redundant bit(s) for error detection purposes. If the added redundant bits provide enough information about the data word, it can also provide error correction capability. When a data block which comprises a plurality of ECC (error control code) coded words is received in a receiving end from a communication media, an error detection algorithm will be applied to check each coded word to see if there is an error in it. If an error is found and is correctable, an error correction algorithm will be used to correct the error. Otherwise the whole data block will be discarded and an ARQ (automatic request for repeat) will be sent back to the transmitting end.

Although ECC techniques are very important for controlling errors, it takes a lot of time and effort to perform the error detection and/or correction works for each received data block. One problem in using ECC is that the amount of wasted effort in performing error detection or correction works to a received data block which is discarded after all the effort. For example, if an incorrect coded word is positioned at the last portion of a received data block which uses parity check method, all the parity check efforts performed to the coded words ahead of the incorrect one are wasted. The whole data block must be discarded and a new data block must be retransmitted. The longer it takes to discover the error, the more the error control effort is wasted. There is no doubt that the error control work must be done to each coded word in order to make sure that the whole data block is correct, and an error of a specific coded word can only be found by directly checking it. But if the possibility in finding such errors in a received data block is high, it will be very questionable that such works should be done at all.

The other problem in using ECC is that not all errors contained in an ECC coded word can be detected. Each ECC has its limit in detecting errors contained in a coded word which is called maximum detectable errors. If the number of errors contained in a coded word exceeds the number of maximum detectable errors, there is no way to tell whether the coded word is correct or not. For example, a minimum distance-4 shortened Hamming code SH(8,4) can detect up to three errors and correct one error. The SH(8,4) code can be generated by deleting all the columns of even weight from a parity check matrix H(15,11) of a Hamming code which is explained in pages 79–81 of the book "Error control coding: fundamentals and applications" by Shu Lin and Daniel Costello, Jr. A 4-bit data word is converted to a 8-bit coded word by using the SH(8,4) code. If more than three errors are contained in a SH(8,4) coded word, there is no way to tell whether the coded word is correct or not from the syndrome calculated from the coded word. It is possible that the coded word is incorrect but the syndrome shows that there is no error in it. It also possible that the syndrome shows that the error is correctable but in fact there are more than one error contained in the coded word which is not correctable.

SUMMARY OF THE INVENTION

The above two problems can be solved if the error condition of a received data block can be obtained or estimated first before performing the error detection or correction work. The error condition of a received data block can be represented by using bit error rate (BER). If the BER of a data block shows that the error rate of the data block is so high that it has very little chance to be accepted, the receiving end may save a lot of effort by discarding the data block directly.

It is therefore the goal of the present invention, by overcoming the limits of the prior art, to devise a new error control method to achieve the follow objects:

1. To provide an error sensing method for estimating the bit error rate (BER) of a data block.
2. To provide a BER-based error control scheme for improving the error control accuracy and efficiency.

Briefly, in a preferred embodiment, the present invention includes an error sensing method for increasing error control capability of a data block having a plurality of ECC (error control code) coded words transmitted through a communication media, the method comprising the steps of:

(1) inserting a plurality of sensing bits into one or more predetermined positions within the data block;

(2) modulating and transmitting the data block to the communication media;

(3) receiving and demodulating the data block from the communication media;

(4) extracting the sensing bits out of the received data block and calculating a BER by using the extracted sensing bits; and (5) requesting for retransmission if the BER of the received data block is worse than a predetermined BER1 which is approximately equal to the ratio of the number of maximum detectable errors of the ECC to the number of bits contained in one ECC coded word.

The data block is modulated by using amplitude-shift-keying (ASK) modulation and each of the sensing bits is modulated as a negative edge which is most sensitive to noises contained within the communication media.

It is an advantage of the present invention that it provides an error sensing method which can be easily implemented in a communication system. The most sensitive data bit in sensing the noises in the communication media is chosen as the sensing bit to provide a very accurate measurement of the error condition of a received data block. Predetermined positions within a data block can be selected in any selected place as long as they can provide a good measurement of the BER. Other use of the sensing bits in predetermined positions such as data transparency can also be implemented in the present invention with no extra cost.

It is another advantage of the present invention that the calculated BER provides a very good measurement of the error condition within the received data block. Although the noise distribution the received data block may be random, the sensing bits positioned in various predetermined positions within the received data block provide a life sample of the error condition within the received data block. Besides, since the sensing bit is the most sensitive bit in sensing the noises, it also highly increases the accuracy of the error measurement.

It is still another advantage of the present invention that it provides an effective BER-based error control scheme. If the BER of the received data block shows that the number of errors contained within a coded word may exceed a predetermined BER1 such as the ratio of the maximum detectable errors of the ECC to the number of bits contained in one coded word, the data block may have been seriously corrupted during the transmission. If the error detection process of the ECC is applied to the received data block, the possibility of discarding the data block is very high. Besides, even if the data block survives after the error detection process, it is still possible that some undetectable errors may contain in the received data block because the number of errors contained in each coded word estimated by the BER is worse than the number of maximum detectable errors of the ECC and the error detection process may not be able to detect all of them. It costs more for a system to recover such undetectable errors, and it is possible that they may never be discovered. Discarding such data block immediately instead of performing the routine error checking process may save a lot of effort and also may reduce the possibility of allowing undetectable errors.

These and other objects and the advantages of the present invention will no doubt become obvious to those of ordinary skill in the art after having read the following detailed description of the preferred embodiment which is illustrated in the various figures and drawings.

DETAILED DESCRIPTION OF THE PREFERRED EMBODIMENT

Figure 1:
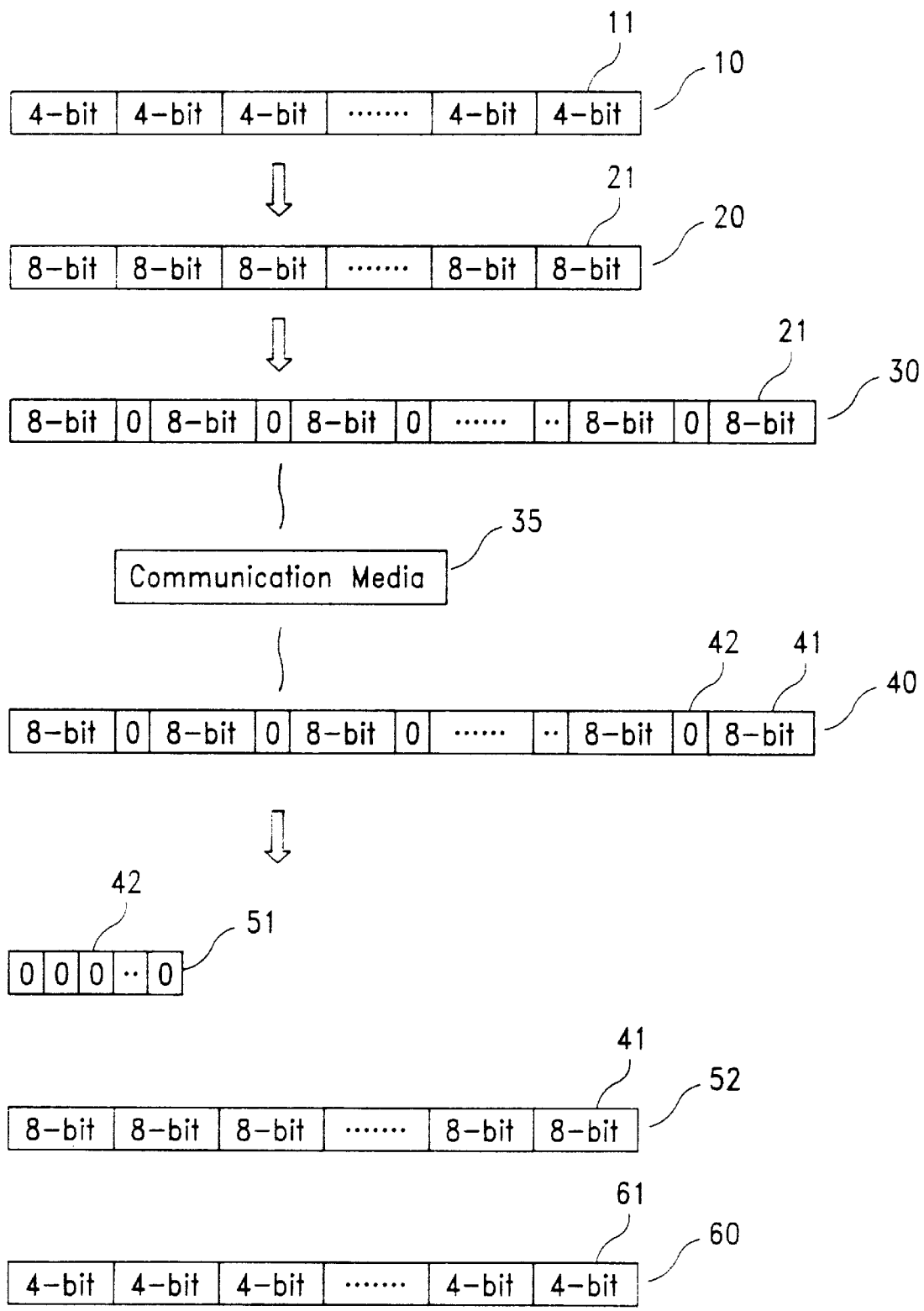
FIG. 1 a diagrammatic view which shows various data formats for each step of a data communication process according to the present invention.

FIG. 1 a diagrammatic view which shows various data formats for each step of a data communication process according to the present invention. It shows a data block 10 which comprises a plurality of 4-bit data word 11 to be transmitted. The block 10 is converted into a block 20 by using a minimum distance-4 shortened Hamming code SH(8,4). It adds 4 redundant bits to each 4-bit data word 11 and forms the 8-bit coded words 21 in block 20. After the block 20 is created, a sensing bit 0 is inserted between every two coded words 21 and forms a new block 30 which is ready for data transmission. The inserting of the 0's between coded words 21 can also be used for data transparency purpose to prevent more than eight consecutive 1's in the data portion.

The block 30 is modulated by using amplitude-shift-keying (ASK) modulation. The modulated block is then transmitted to a communication media 35 from a transmitting end. Since all the sensing bits are modulated into negative edges which will be explained in FIG. 4, they are very sensitive to noises contained in the communication media. If the data block is corrupted by the noises during the transmission, the sensing bits inserted in the data block will have a better chance to sense the errors caused by the noises because of their sensitivity.

After the modulated block is received at a receiving end, the modulated block will be demodulated and forms a block 40 which should comprise all the coded words 41 and the sensing bits 42 in their original sequences. The block 40 is then divided into two blocks: the sensing bit block 51 and the coded word block 52. The sensing bit block 51 is formed by extracting all the sensing bits 42 from the predetermined positions which is one bit between every two 8-bit coded words of the block 40. The block 51 is then used to calculate a bit error rate (BER) of the received block 40. The BER is equal to the ratio of the number of 1's (error bits) to the total number of bits contained in the block 51. If the BER shows that the block 40 is good enough for error correction, the error detection and correction processes of the SH(8,4) code will be applied to the coded word block 52. If there is no error found or all the errors found in the block 52 are correctable, a data block 60 having a plurality of 4-bit data words 61 will be generated for further process.

Figure 2:
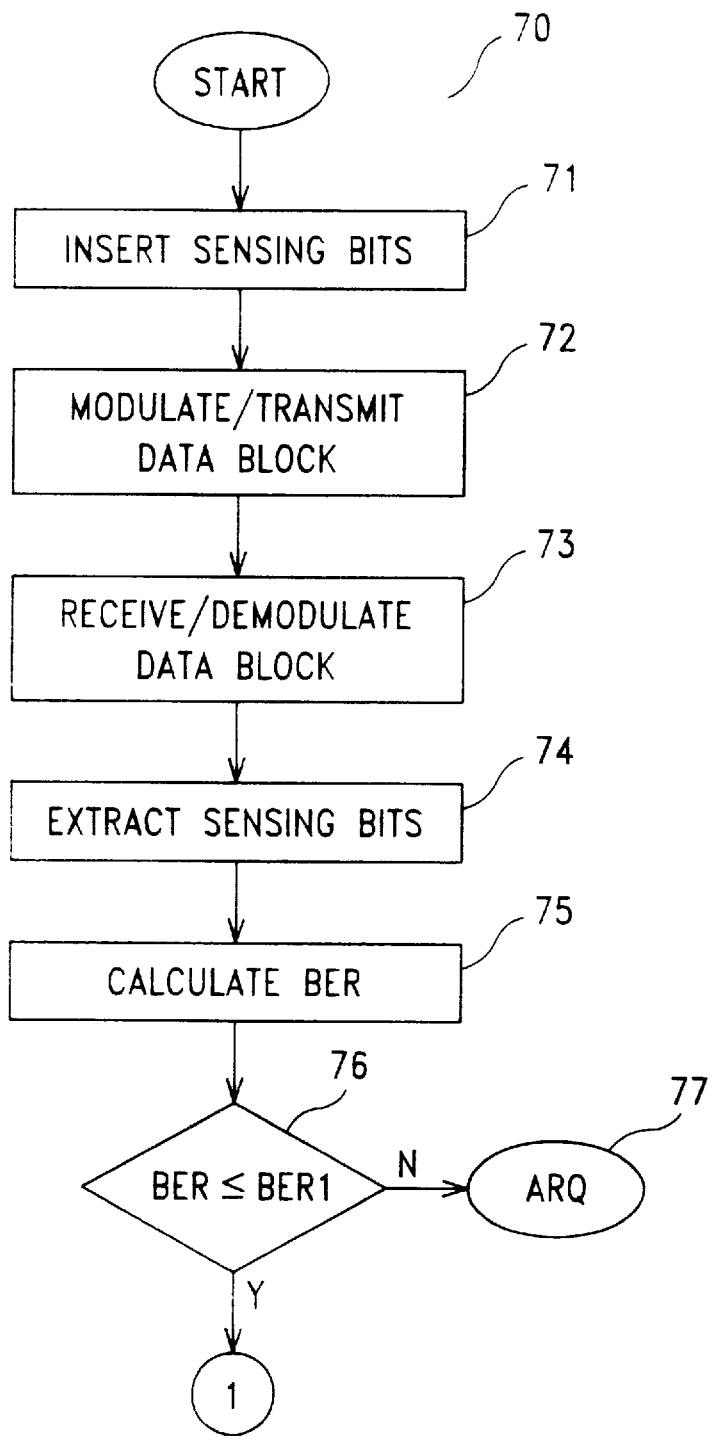
FIG. 2 is a flow chart showing the main procedure of the error sensing method for transmitting a data block according to the present invention.

FIG. 2 is a flow chart showing the main procedure 70 of the error sensing method for transmitting the block 20 according to the present invention. The procedure 70 comprises the following steps:

step 71: insert a plurality of sensing bits 0 between every two neighboring coded words 21 within the block 20 to form a new block 30;

step 72: modulate and transmit the block 30 to the communication media 35;

step 73 receive and demodulate a block 40 from the communication media 35;

step 74 extract the sensing bits 42 out of the block 40 to create the sensing bit block 51 and the coded word block 52;

step 75 calculate a BER by using the extracted sensing bits 42 in the block 51;

step 76 compare the calculated BER with BER1 which is approximately equal to the ratio of the number of maximum detectable error bits (3) of the SH(8,4) code to the number of bits contained in one coded word 41 (8);

step 77 request for retransmission and terminate the procedure 70 if the BER of the block 40 is worse than BER1.

Since the sensing bit 0 is very sensitive to the noises during the transmission and is evenly distributed in the data block 30, the calculated BER can provide a very trustable estimation of the real BER of the received block 40. If the BER is worse than BER1, that means that the received block 40 is most likely being seriously corrupted by errors during the transmission. If the error detection process of the SH(8, 4) code is applied to the block 52 in this case, the possibility of discarding the whole block is very high. Even if the block 52 survives after the error detection process, it is still possible that some undetectable errors may contain in the block 60. The best way to handle this situation is to ignore the received data block 40 and request for retransmission of the whole data block again.

Figure 3:
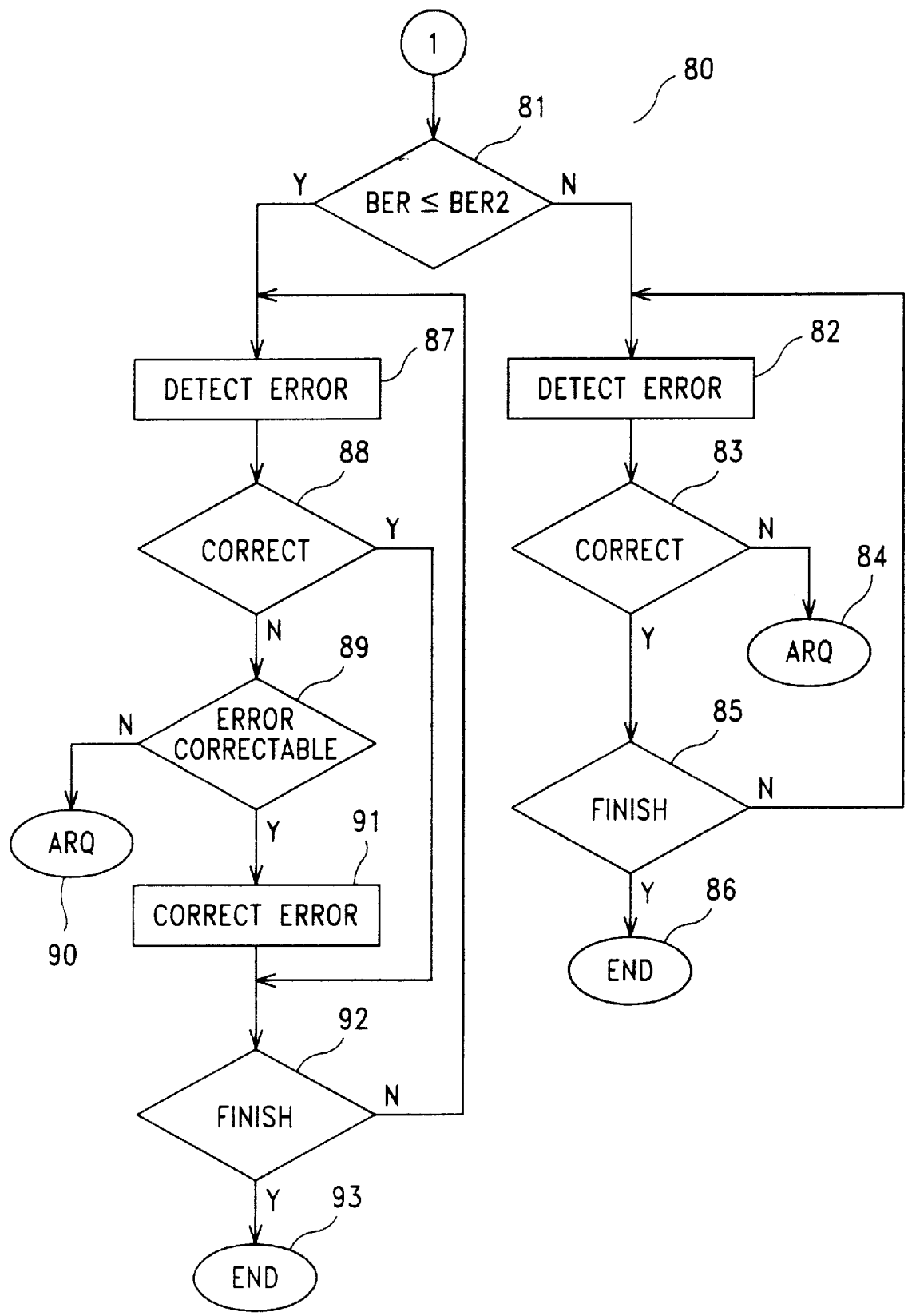
FIG. 3 is a flow chart showing the remaining procedure of the main procedure shown in FIG. 2 for processing a received data block.

FIG. 3 is a flow chart showing the remaining procedure 80 of the main procedure 70 shown in FIG. 2 for processing the block 52. The procedure 80 comprises the following steps:

step 81 compare the BER with BER2 which is approximately equal to the ratio of the number of maximum correctable errors (1) of the SH(8,4) code to the number of bits contained in one coded word (8); if the BER is equal to or smaller than B2, go to step 87;

step 82 apply the error detection process of the SH(8,4) code to one coded word 41;

step 83 if the coded word is correct, go to 85;

step 84 request for retransmission and terminate the procedure 80;

step 85 if any of the coded words 41 in the block 52 is not checked, go to step 82 to check another coded word 41;

step 86 terminate the procedure 80;

step 87 apply the error detection process of the SH(8,4) code to one coded word 41;

step 88 if the coded word 41 is correct, go to step 92;

step 89 if the coded word 41 is correctable, go to step 91;

step 90 request for retransmission and terminate the procedure 80;

step 91 applying the error correction process of the SH(8,4) code to correct the coded word 41;

step 92 if any of the coded words 41 in the block 52 is not checked, go to step 87 to check another coded word 41;

step 93 procedure finished.

The remaining procedure 80 is divided by comparing the BER with BER2. Since the number of maximum correctable errors of an ECC is always smaller than its maximum detectable errors, the value of BER2 is smaller than BER1. Steps 82–86 apply the error detection process to check each of the coded words within the received data block until an error is found or all the coded words are checked. If an error is found, an ARQ (request for retransmission of the received data block 40) will be issued and the procedure 80 is also terminated. Steps 87–93 apply both error detection and correction processes to check or correct each of the coded words 41 within the block 52 until an error is found incorrectable or all the coded words are processed. If an error is found incorrectable, an ARQ (request for retransmission) will be issued and the procedure 80 is also terminated. The difference between steps 82–86 and steps 87–93 is whether to perform the error correction process to errors which are correctable. If the BER is larger than BER2, that means most of the coded words may contain more than one error which is incorrectable. In this case only the error detection process is applied to the block 52. Otherwise, both the error detection and error correction processes are applied to the block 52.

Other variations of the procedures 70 and 80 can also be arranged to achieve similar effect of the two procedures. One variation is to eliminate steps 81–86 so that both error detection and correction processes will be applied to the block 52 when the BER is better than BER1. That means if the average number of errors contained in each coded word is better than the BER1, the block 52 will be processed until one incorrectable error is found or the whole block is finished. The other variation is to eliminate the steps 76–77 and replace the steps 82–86 with a step ARQ (request for retransmission). That means the error detection and correction processes will be applied to the block 52 only if the BER is better than BER2. Otherwise the whole block will be discarded.

Figure 4:
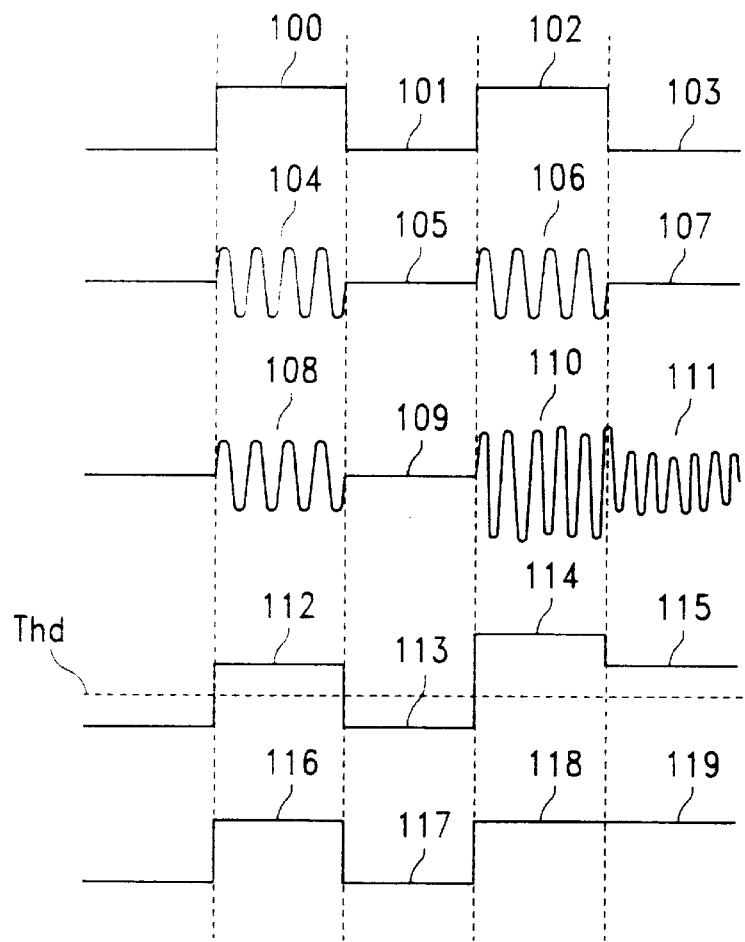
FIG. 4 shows the timing diagrams of four digital data bits "1010" before and after transmitted through a communication media.

FIG. 4 shows the timing diagrams of four digital data bits "1010" before and after transmitted through a communication media. The four digital data are first generated as four digital signals 100, 101, 102 and 103. Each logic 1 is generated as a positive edge and each logic 0 is generated as a negative edge. These four digital signals are modulated into two carrier signals 104 and 106 and two negative edges 105 and 107 by using amplitude-shift-keying (ASK) modulation. After the four modulated signals are transmitted through the communication media, four signals 108, 109, 110 and 111 are received at a receiving end. It shows that the signals 110 and 111 are both corrupted by noises during the transmission. After a demodulation process, these four signals are converted into four envelope signals 112, 113, 114 and 115. The four signals are compared with a threshold Thd and four digital signal 116, 117, 118 and 119 are generated. Compared the last four digital signals 116–119 with the original four digital signals 101–104, we can see that signal 119 is incorrect although both the signals 118 and 119 have been corrupted during the transmission process. This example shows that the logic 0 is more sensitive to noises than the logic 1 when the ASK modulation is used for signal transmission. Such characteristic makes the logic 0 a good choice as a sensing bit for sensing error condition during a data transmission. In general, the most sensitive data bit of all the available data bits of a data block to noises contained within a communication media should be selected as the sensing bit to increase the effectiveness of the sensing bits in sensing error condition. The same principle can be applied to other modulation methods in selecting the sensing bit to achieve the same effect.

Figure 5:
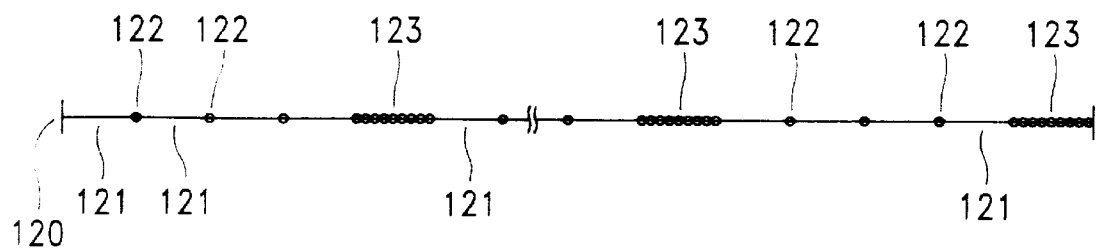
FIG. 5 shows two methods in distributing the sensing bits in a data block for determining BER of a data block.

FIG. 5 shows two methods in distributing the sensing bits in a data block 120 for determining the BER. The block 120 comprises a plurality of coded words 121. Two types of sensing bits are distributed in the block 120: single-bit-type sensing bit 122 and burst-type sensing bit 123. Each of the burst-type sensing bits comprises an identical number of sensing bits in it for sensing burst-type errors. The single-bit-type sensing bit 122 is inserted between every two neighboring coded words 121 within the data block 120. Such distribution evenly covers the whole data block and can provide a good estimation of the average BER of the whole data block, but it can not catch burst-type errors. The burst-type sensing bit 123 is used to cover such deficiency. Several burst-type sensing bits are inserted into various predetermined positions within the data block 120 to catch burst-type errors. The combination of these two types of sensing bits can provide good coverage for sensing various error patterns.

The above disclosure is not intended as limiting. Those skilled in the art will readily observe that numerous modifications and alterations of the device may be made while retaining the teachings of the invention. Accordingly, the above disclosure should be construed as limited only by the metes and bounds of the appended claims.

What is claimed is:

1. An error sensing method for increasing error control capability of a data block having a plurality of ECC (error control code) coded words transmitted through a communication media, the method comprising the steps of:

(1) inserting a plurality of sensing bits into one or more predetermined positions within the data block;

(2) transmitting the data block to the communication media;

(3) receiving the data block from the communication media;

(4) extracting the sensing bits out of the received data block and calculating a bit error rate (BER) by using the extracted sensing bits, the BER being equal to the ratio of the number of error bits within the extracted sensing bits to the total number of the extracted sensing bits; and (5) requesting for retransmission if the BER of the received data block is worse than a predetermined BER1 which is approximately equal to the ratio of the number of maximum detectable errors of the ECC to the number of bits contained in one ECC coded word.

2. The error sensing method of claim 1 wherein the ECC provides both error detection and error correction capabilities, and wherein the error sensing method of claim 1 further comprises the steps of:

(6) comparing the BER of the received data block to a predetermined BER2 which is approximately equal to the ratio of the number of maximum correctable errors of the ECC to the number of bits contained in one ECC coded word;

(7) applying the error detection process of the ECC to the received data block if the BER is worse than the BER2;

(8) applying the error detection and error correction processes of the ECC to the received data block if the BER is better than the BER2.

3. The error sensing method of claim 2 wherein the step (7) comprises the following sub-steps:

(s1) applying the error detection process to check each of the coded words within the received data block until an error is found or all the coded words are checked;

(s2) request for retransmission of the received data block if an error is found.

4. The error sensing method of claim 2 wherein the step (8) comprises the following sub-steps:

(s1) applying the error detection and correction processes to check or correct each of the coded words within the received data block until an error is found incorrectable or all the coded words are processed;

(s2) request for retransmission of the received data block if an error is found incorrectable.

5. The error sensing method of claim 1 wherein the data block is modulated by using amplitude-shift-keying (ASK) modulation and each of the sensing bits is modulated as a negative edge which is most sensitive to noises contained with the communication media.

6. The error sensing method of claim 1 wherein the most sensitive data bit of all the available data bits of the data block to noises contained within the communication media is selected as the sensing bit.

7. The error sensing method of claim 1 wherein at least one sensing bit is inserted between every two neighboring coded words within the data block.

8. The error sensing method of claim 7 wherein the sensing bits inserted between all the neighboring coded words are also used for data transparency purpose.

9. The error sensing method of claim 1 wherein an identical number of sensing bits are inserted into each predetermined location within the data block.

10. An error sensing method for increasing error control capability of a data block having a plurality of ECC (error control code) coded words transmitted through a communication media, the ECC having both error detection and error correction capabilities, the method comprising the steps of:

(1) inserting a plurality of sensing bits into one or more predetermined positions within the data block;

(2) transmitting the data block to the communication media;

(3) receiving the data block from the communication media;

(4) extracting the sensing bits out of the received data block and calculating a bit error rate (BER) by using the extracted sensing bits, the BER being equal to the ratio of the number of error bits within the extracted sensing bits to the total number of the extracted sensing bits;

(5) requesting for retransmission if the BER of the received data block is worse than a predetermined BERx which is approximately equal to the ratio of the number of maximum detectable errors of the ECC to the number of bits contained in one ECC coded word; and (6) applying the error detection and error correction methods of the ECC to the received data block.

11. The error sensing method of claim 10 wherein the step (6) comprises the following sub-steps:

(s1) applying the error detection and correction processes to check or correct each of the coded words within the received data block until an error is found incorrectable or all the coded words are processed;

(s2) request for retransmission of the received data block if an error is found incorrectable.

12. An error sensing method for increasing error control capability of a data block having a plurality of ECC (error control code) coded words transmitted through a communication media, the ECC having both error detection and error correction capabilities, the method comprising the steps of:

(1) inserting a plurality of sensing bits into one or more predetermined positions within the data block;

(2) transmitting the data block to the communication media;

(3) receiving the data block from the communication media;

(4) extracting the sensing bits out of the received data block and calculating a bit error rate (BER) by using the extracted sensing bits, the BER being equal to the ratio of the number of error bits within the extracted sensing bits to the total number of the extracted sensing bits;

(5) requesting for retransmission if the BER of the received data block is worse than a predetermined BERx which is approximately equal to the ratio of the number of maximum correctable errors of the ECC to the number of bits contained in one ECC coded word; and (6) applying the error detection and error correction methods of the ECC to the received data block.

* * * * *